United States Patent
Lundgren (10) Patent No.: US 9,139,299 B2
(45) Date of Patent: Sep. 22, 2015

(54) VERTICAL TAKEOFF AND LANDING ROADABLE VEHICLE

(75) Inventor: Gert Magnus Lundgren, Chula Vista, CA (US)

(73) Assignee: LAPCAD Engineering, Inc., San Diego, CA (US)

( * ) Notice: Subject to any disclaimer, the term of this patent is extended or adjusted under 35 U.S.C. 154(b) by 151 days.

(21) Appl. No.: 13/545,150

(22) Filed: Jul. 10, 2012

(65) Prior Publication Data

US 2014/0014764 A1     Jan. 16, 2014

(51) Int. Cl.
| | | |
|---|---|---|
| *B64C 37/02* | (2006.01) | |
| *B64C 37/00* | (2006.01) | |
| *B64C 29/00* | (2006.01) | |
| *B64C 39/08* | (2006.01) | |

(52) U.S. Cl.
CPC ............. *B64C 37/00* (2013.01); *B64C 29/0033* (2013.01); *B64C 39/08* (2013.01)

(58) Field of Classification Search
USPC ................ 244/2, 12.4, 56, 49, 45 R, 23 B, 46
See application file for complete search history.

(56) References Cited

U.S. PATENT DOCUMENTS

| | | | | |
|---|---|---|---|---|
| 2,609,167 | A * | 9/1952 | Gero, Jr. .......................... | 244/49 |
| 4,627,585 | A * | 12/1986 | Einstein ............................ | 244/2 |
| 6,224,012 | B1 * | 5/2001 | Wooley ............................ | 244/2 |
| 6,457,670 | B1 * | 10/2002 | Geranio ........................... | 244/2 |
| 6,786,450 | B1 * | 9/2004 | Einstein ............................ | 244/2 |
| 7,938,358 | B2 * | 5/2011 | Dietrich et al. ................... | 244/2 |
| 8,376,263 | B2 * | 2/2013 | Eames .............................. | 244/2 |

* cited by examiner

*Primary Examiner* — Christopher P Ellis (57) ABSTRACT

A roadable vehicle with a single nacelle assembly that contains a pair of inline counter-rotating propellers. Two inline counter-rotating engines are directly connected to the propellers. One engine is shut down in horizontal flight to improve efficiency. Gimbal mounting the nacelle assembly permits thrust to be directed forward to back and left to right to control the vehicle position in the horizontal plane, when hovering. Varying the relative engine speeds controls yaw. The roadable vehicle is adaptable as an unmanned vehicle. The foldable wings equipped with automotive type wheels provide for travel off-road as well as on the highway.

9 Claims, 13 Drawing Sheets

VERTICAL TAKEOFF AND LANDING ROADABLE VEHICLE

TECHNICAL FIELD

The present invention relates generally to Vertical/Short Take-off and Landing Roadable Airborne Vehicles, and more particularly to a convertible that transforms from a wheel borne human or cargo carrier, to an airborne vehicle.

BACKGROUND OF THE INVENTION

Vertical/Short Take-Off and Landing (V/STOL) Vehicles are fixed-wing aircraft that can lift off from the ground and land in a vertical hover, and transition from the vertical hover mode to a horizontal flight mode and back to vertical hover mode. Configurations have included vectored-thrust aircraft like the British AV8B Harrier now built by Boeing, and the F-35B Joint Strike Fighter from Lockheed-Martin. These concepts direct the thrust from a jet engine downward to hover and rearward for horizontal flight. Tilt-wing/tilt-rotor aircraft like the V-22 Osprey, jointly from Bell Helicopter and Boeing, direct thrust from two rotatable proprotor assemblies situated in engine nacelles at the ends of the main wing.

Roadable Airborne Vehicles are aircraft that can transform themselves such that they can be driven on roads intended for automobiles. Terrafugia of Terrafugia, Inc. is one such vehicle.

Vertical/Short Take-off and Landing Roadable Airborne Vehicles are aircraft that not only can transform themselves from an airplane to an automobile, but can also take off and land vertically. The Skycar by Moller International is an attempts to accomplish this combination of different operational modes.

From the foregoing it will be apparent that rather than decentralizing a multitude of power plants, safety and efficiency can be realized by concentrating a few power plants in the near vicinity of the vehicle center of gravity. Further, it will be apparent that benefits will be gained by utilizing inline counter-rotating propellers. It will also be apparent that by assigning multiple functions for most of the vehicle components, the most weight efficient structure can be achieved.

SUMMARY OF THE INVENTION

In a preferred embodiment, inline counter-rotating propellers are employed on a V/STOL roadable vehicle, that does not require a transmission to create the counter rotation of the individual propellers. Additionally, in a preferred embodiment either engine can be throttled back and feathered, for improved efficiency in horizontal flight mode. A roadable vehicle embodying the invention is simple to build and maintain and is adaptable to either piloted or unpiloted applications, providing benefits to aircraft of all scales and sizes. Furthermore, two engines improve aircraft safety during both horizontal flight mode and vertical hover mode. In horizontal flight mode, loss of power from one engine will not require re-trimming of the aircraft because both engines are mounted inline. In vertical hover mode, loss of one engine will still allow the remaining engine to provide a survivable rate of descent.

In one embodiment of the invention, a vehicle employs a single nacelle (and thrust line) with a pair of inline counter-rotating propellers and a pair of inline counter-rotating engines, where each engine/propeller is individually controllable and physically independent thus no transmission connecting the two engines is involved. In addition, in this arrangement, it is easy to simply shut down one engine and only fly in horizontal flight mode with one propeller engaged.

In another embodiment, the engine nacelle is mounted such that, when in vertical hover mode, the engine nacelle (and the thrust line) is rotatable about the longitudinal axis of the aircraft, providing the ability to direct thrust downward and to the right or downward and to the left. Varying the direction of the engine nacelle (and the thrust line) from left to right thereby provides lateral control of the vehicle position, see FIG. 9. Varying the direction of the engine nacelle from front to back provides fwd/aft control of the vehicle position, see FIG. 11. This arrangement eliminates the need for a complex collective and cyclic blade pitch assembly.

In another embodiment of the present invention, the relative thrust of the inline counter-rotating engines is varied to control yaw in vertical hover mode. In this case, under normal operating conditions, both engines are equally powered and the torque produced by the first engine and propeller is equal to the torque produced by the second engine and propeller, but in the opposite direction, so the combined torque on the vehicle is zero. Also, each engine and propeller produces half of the total thrust. When the thrust of one engine is increased and the thrust of the other engine is decreased by the same amount, the resulting non-zero net torque results in yaw of the aircraft with no net change in the thrust produced by the pair of propellers. With this arrangement, there is no need for additional control surfaces situated in the downwash of the propellers to control yaw. A further embodiment includes electric motors as an alternative to internal combustion engines, to drive the propellers. This provides for easier control of relative motor speed and provides quicker yaw response.

Another embodiment of the present invention is an automatic feedback control mechanism for stabilizing flight characteristics of the vehicle when in vertical hover mode.

An additional embodiment of the invention incorporates the transformation of the wings into landing gears, including the wheels, for transportation on regular roads.

Other aspects and advantages of the present invention will become apparent from the following detailed description, taken in conjunction with the accompanying drawings, illustrating by way of example the principles of the invention.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Introduction

The drawings show for purposes of illustration, a roadable vehicle with VTOL/STOL capability. It utilizes a single centrally located tiltable nacelle containing a pair of inline counter-rotating propellers, driven by individual turboprop engines. This provides for a simplified mechanism that does not require a transmission to create the counter-rotation of the propellers.

Additionally, by shutting down one of the inline counter-rotating engines in horizontal flight mode, this configuration improves efficiency of the vehicle in horizontal flight mode. By mounting the nacelle in such a way that the nacelle can be rotated about the longitudinal axis and by independent engine speed control, a simplified flight control system for vertical hover mode may be achieved. In an additional embodiment, a simplified flight stabilization system is applied to the flight control system. Also, in another embodiment, the flight control system is operated by remote control.

Figure 1:
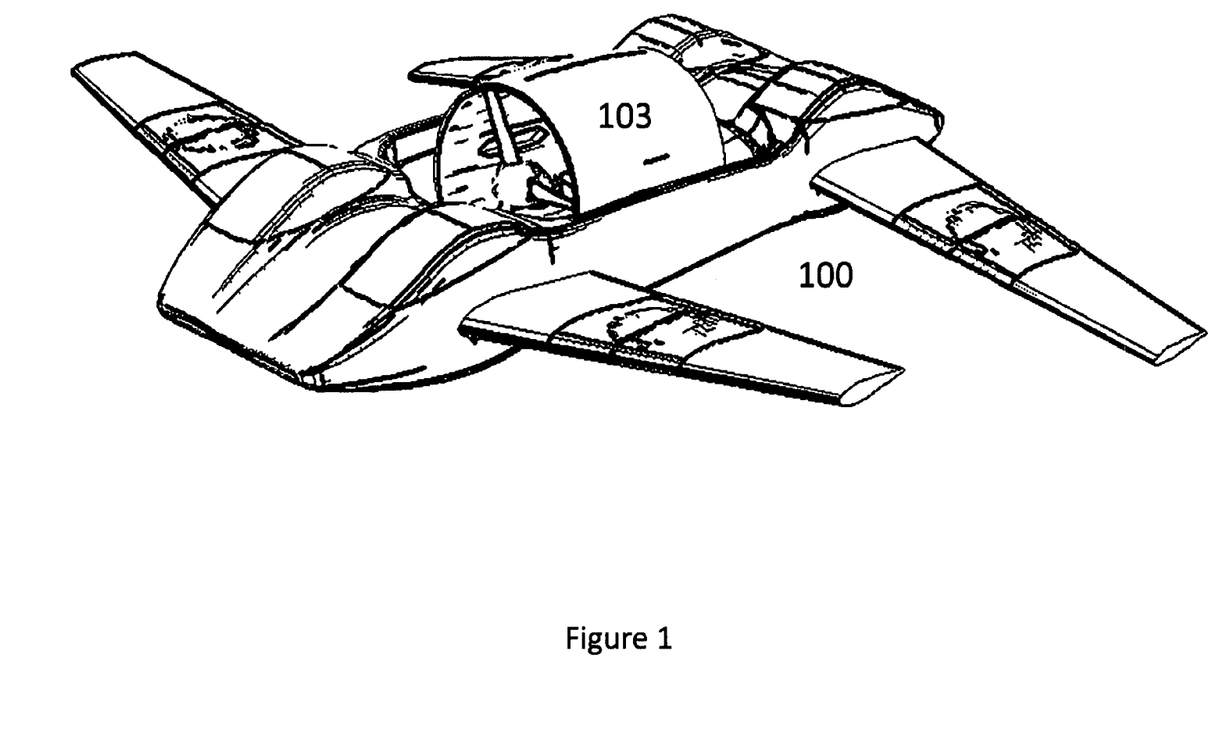
FIG. 1 is a perspective view of one embodiment of a roadable vehicle in wing borne flight mode. Note that the lack of a vertical tail is compensated for by the rear wings forming an inverted V-Tail.
Figure 2:
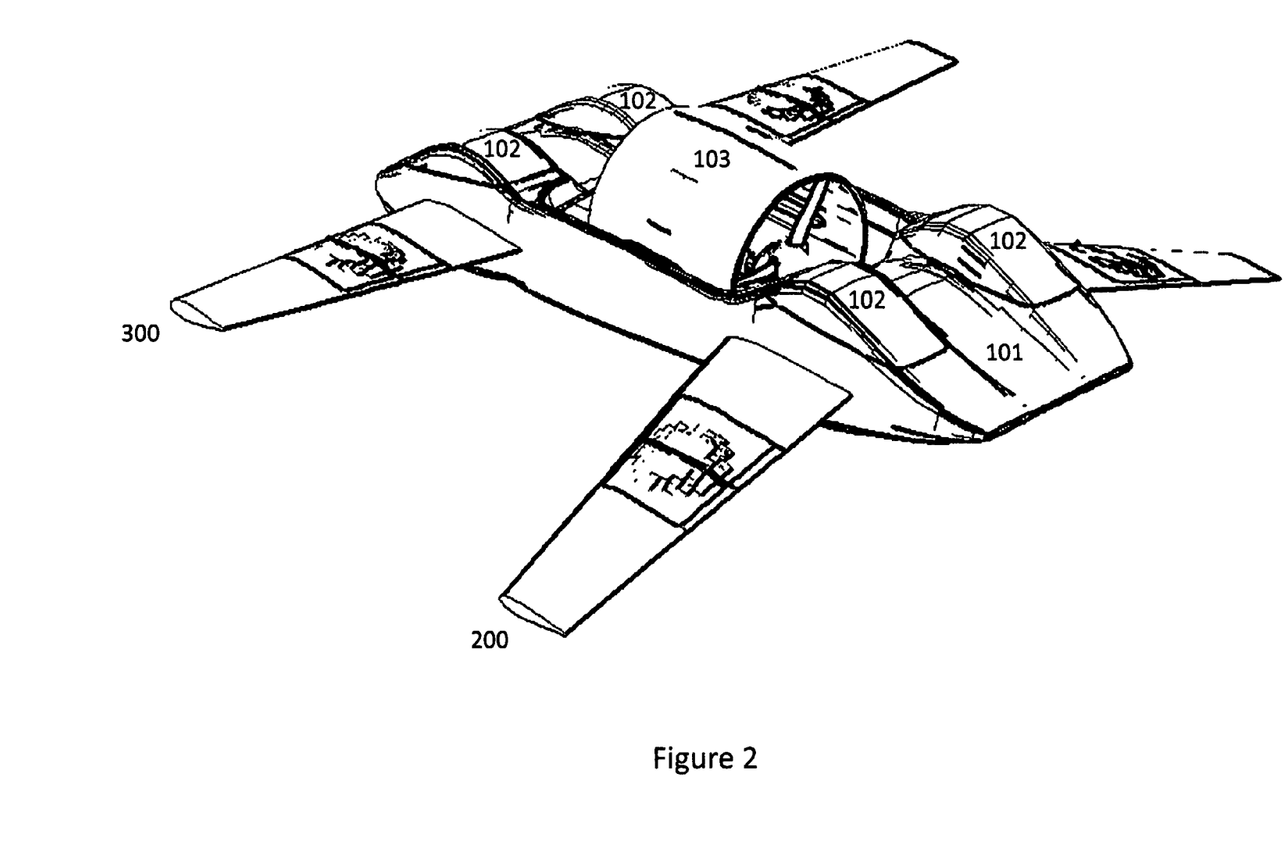
FIG. 2 is a rear view of the vehicle described in FIG. 1.
Figure 3:
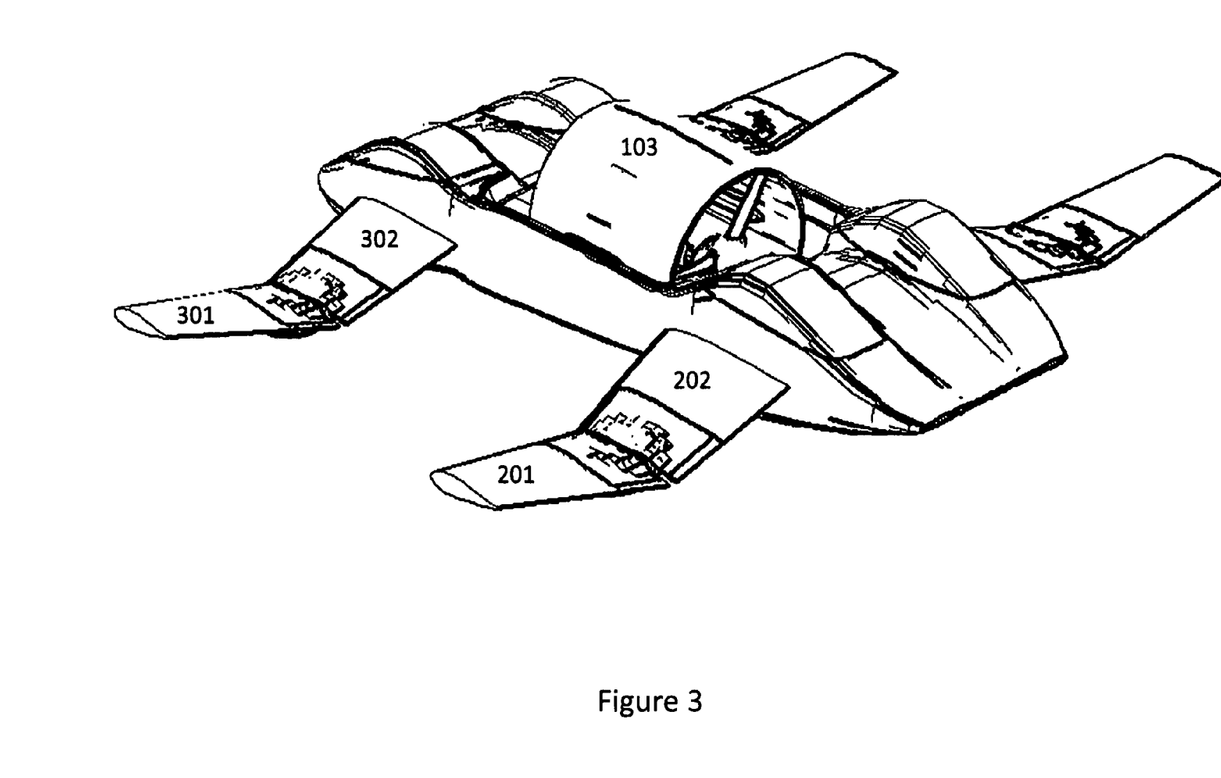
FIG. 3 is a perspective view of the roadable vehicle of FIG. 1 in the early stage of transforming from a wing borne mode to that of a hover mode.
Figure 4:
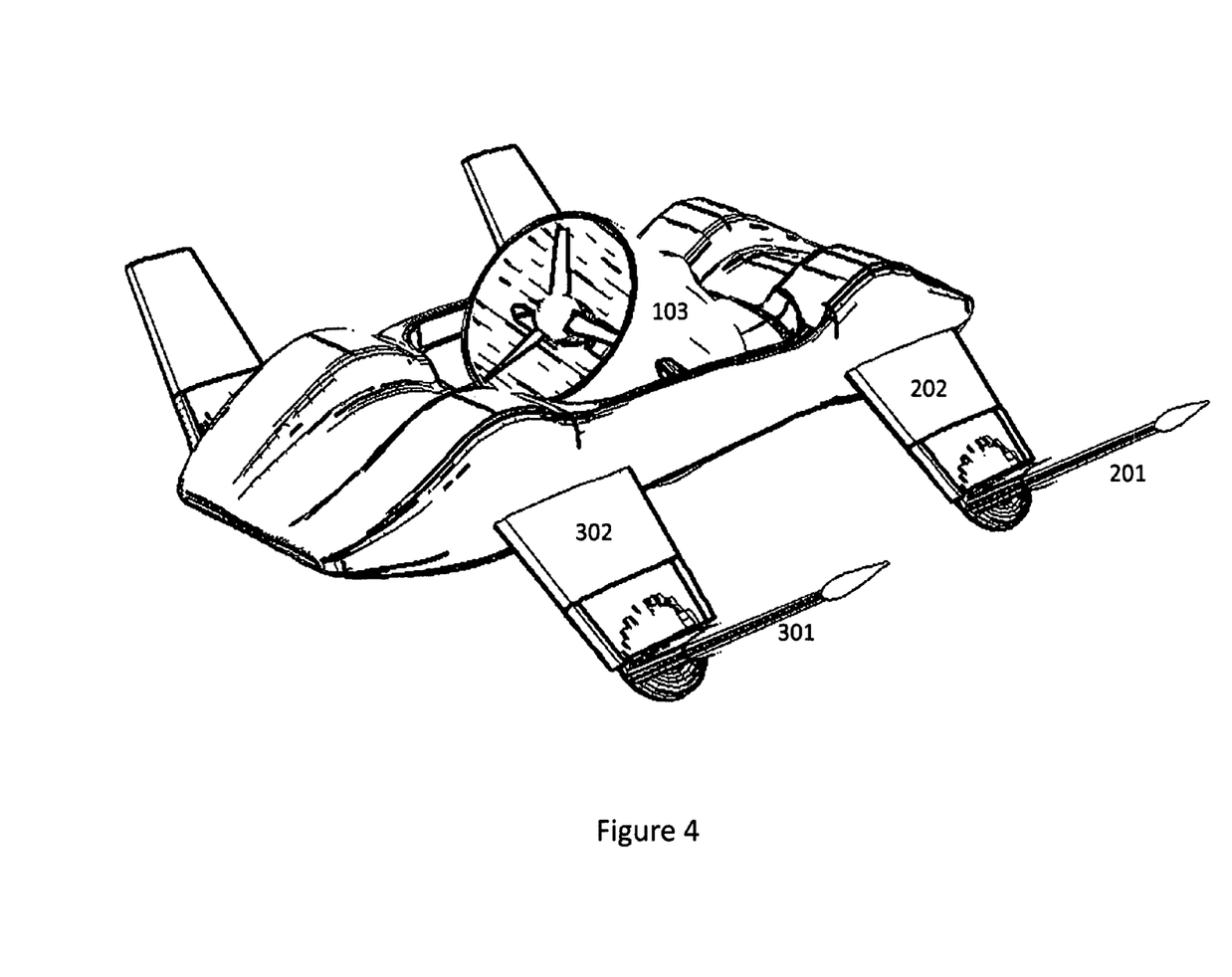
FIGS. 4 through 6 illustrate the completion of this transformation, and landing in a vertical mode.
Figure 5:
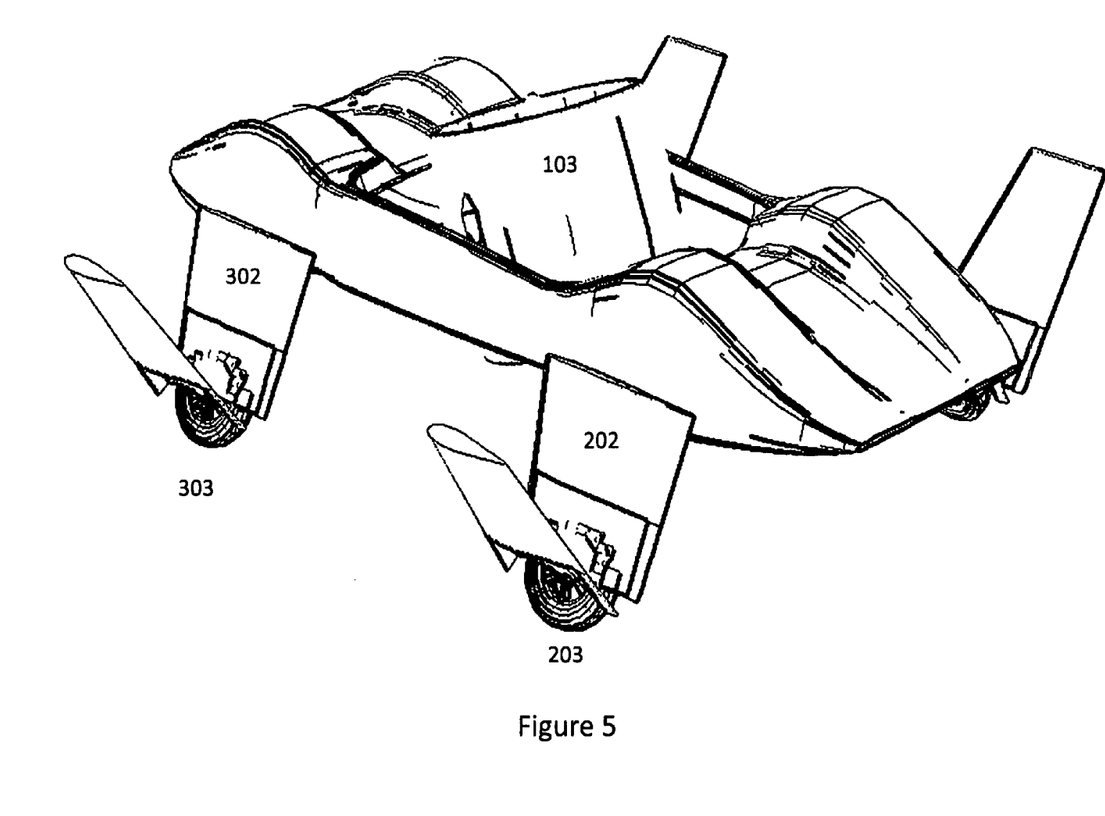
Figure 6:
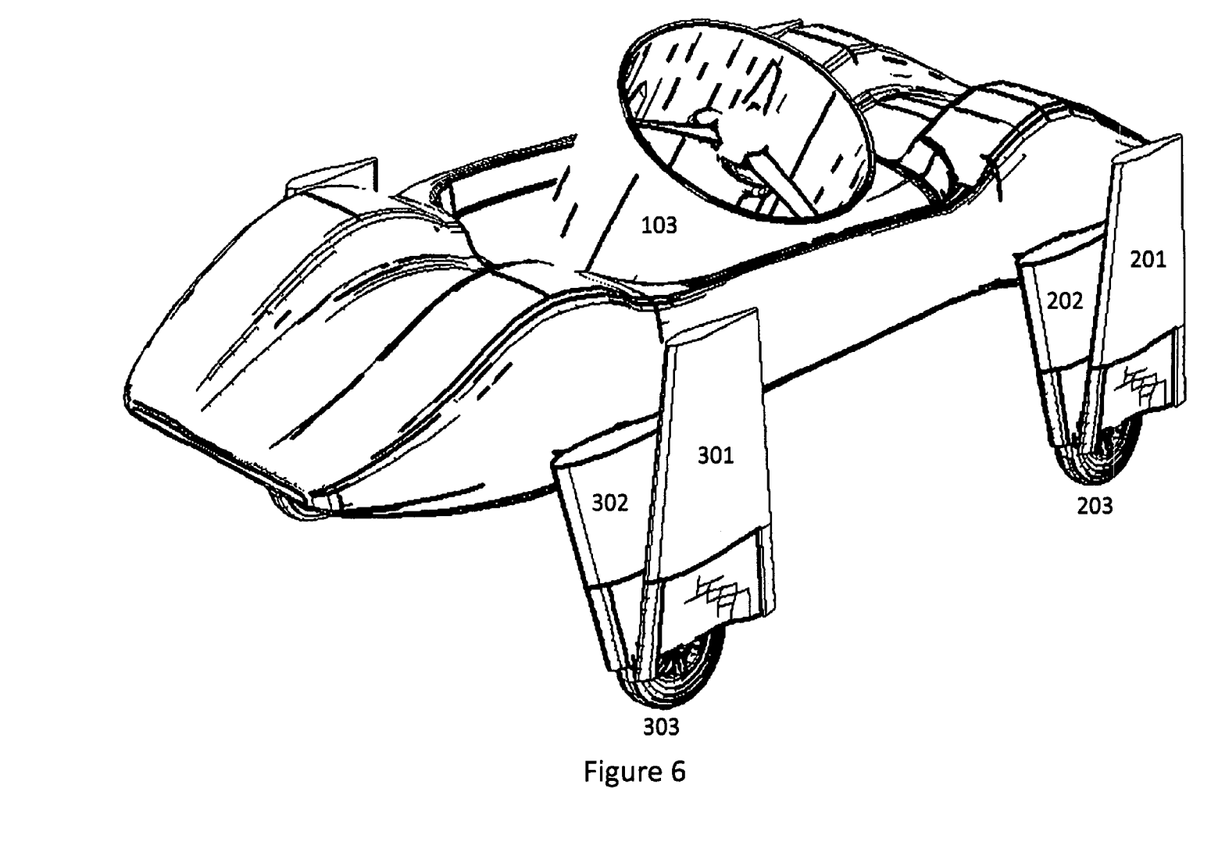

FIGS. 1 and 2 show a perspective view of a roadable vehicle (referred to generally as 100) in horizontal flight mode according to one embodiment of the invention. In horizontal flight mode, the roadable vehicle 100 performs similarly to a regular fixed wing aircraft. The nacelle assembly 103 is in a horizontal position, directing thrust backward, which drives the roadable vehicle 100 forward. The motion of the wings 200 and 300 through the air provides the lift that keeps the roadable vehicle 100 airborne. The horizontal flight mode is very efficient for traveling from one point to another, because nacelle 103 only needs to provide enough power to keep the roadable vehicle 100 moving forward fast enough to maintain sufficient lift to remain airborne. Flight control may be achieved by tilting the rear wing 200 to control pitch, and by differentially tilting the forward wing 300 to control roll. The four cockpits 102 provide secure and protected travel accommodations for four fully equipped soldiers, or commercial passengers.

FIGS. 3 through 6 illustrate how the airborne vehicle is transformed into a hovering vehicle, and ultimately into a roadable vehicle. The inner wing panels 202 and 302 fold downward while the outer wing panels 201 and 301 fold upward, and exposing the wheels 203 and 303 attached to the inner wing panels 202 and 302. As the vehicle slows down, the nacelle 103 tilts into a near vertical position, and thereby providing the lift needed for hover and descent to the ground, or to the deck of a marine vehicle. Positioning of the vehicle during the hover mode is accomplished by tilting the nacelle 103 around the longitudinal and lateral axis. Heading control is obtained by differentiating the power of the two turboprop engines housed in the nacelle 103. While the outer wing panels 201 and 301 become idle during hover and travel on the ground, the inner wing panels 202 and 302 are functioning as landing gear, as well as providing the undercarriage to support the roadable vehicle during ground travel. This is a new and efficient way of utilizing the components most highly loaded during both wing borne operation and during ground travel.

Figure 7:
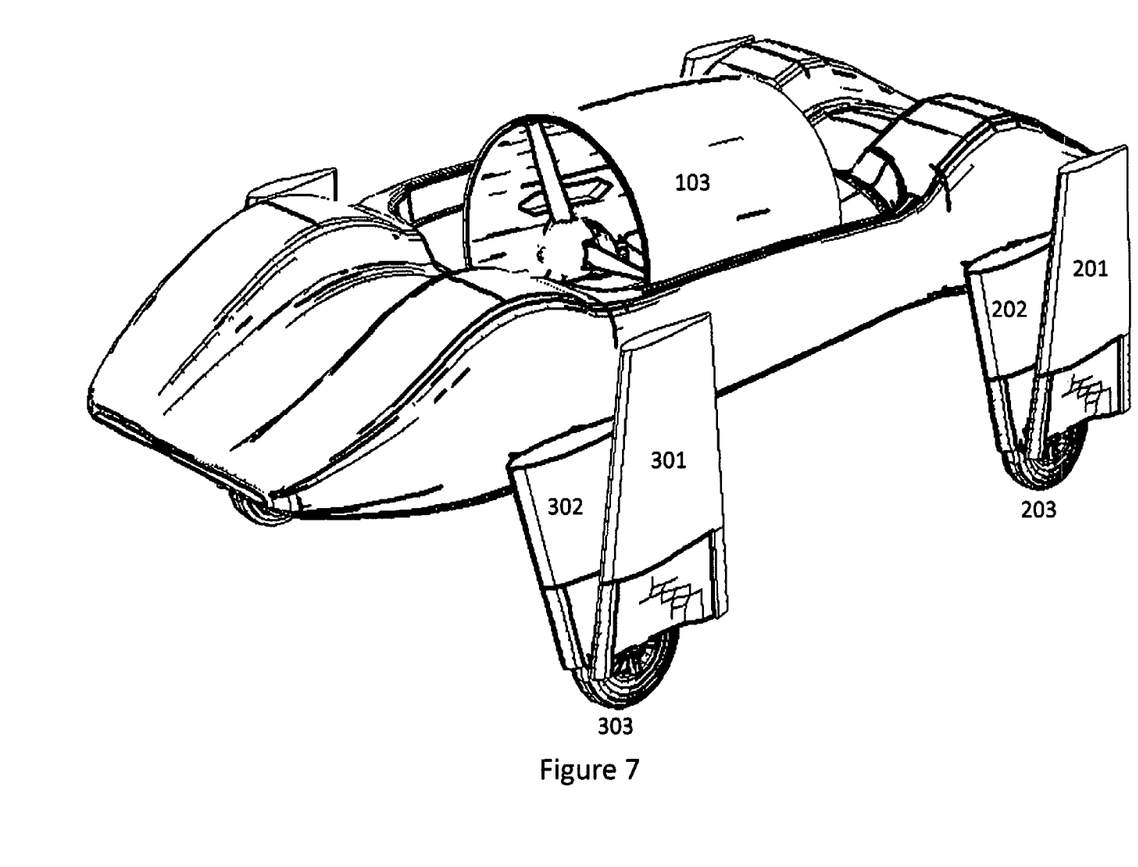
FIG. 7 shows the vehicle in a roadable mode, with propulsion coming from either wheel mounted electric motors, supplied with power from the turboprop generators, or propulsion coming from one of the turboprop engines providing direct rear-ward thrust during ground operations.

FIG. 7 shows the roadable vehicle ready for travel on the ground. Power to the wheels 203 and 303, equipped with electric motors, is provided by generators being part of the two turboprop engines housed in the nacelle 103. Steering is provided on the ground by turning the inner wing panels 302, and thereby bringing the wheels 303 along.

Figure 8:
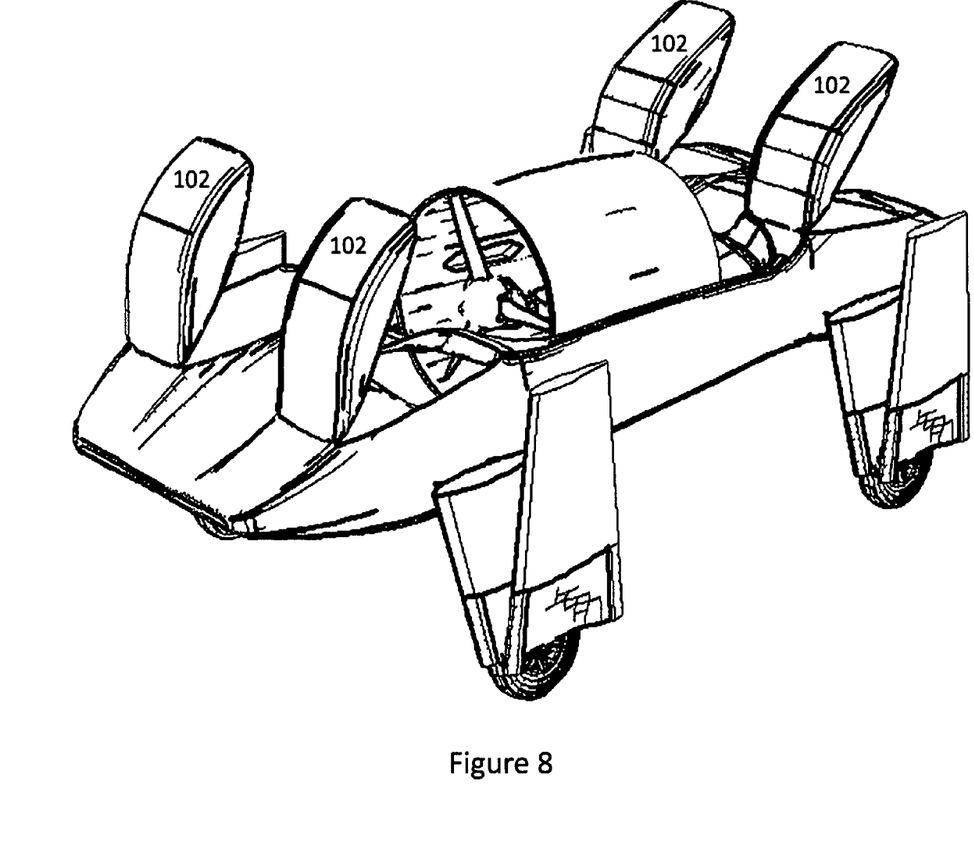
FIG. 8 shows the canopies of the four passenger or cargo compartments being opened.

FIG. 8 shows how the four canopies 102 opening up to allow for entry and exit of four fully equipped soldiers, or commercial travelers.

Figure 9:
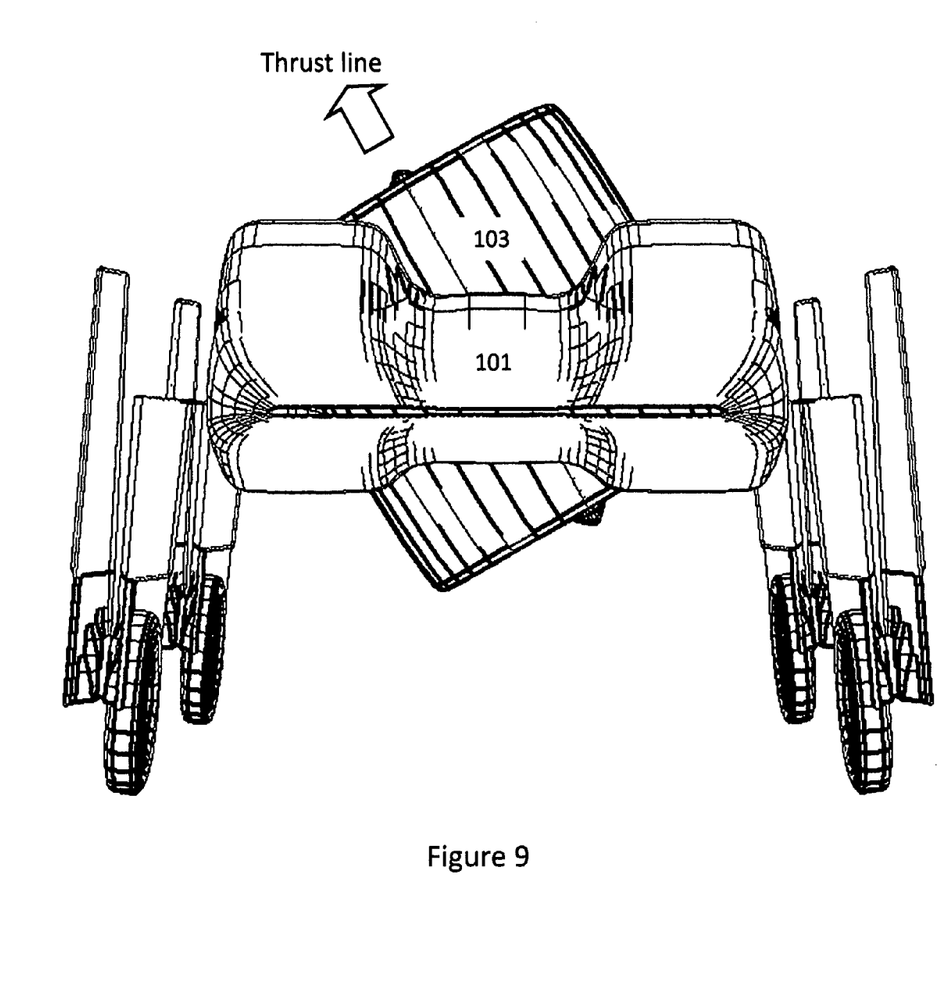
FIG. 9 illustrates how, in the hover mode, translation in the lateral direction is achieved, by tilting the engine nacelle around the longitudinal axis.

FIG. 9 illustrates how, in the hover mode, translation in the lateral direction is achieved, by tilting the engine nacelle 103 around the longitudinal axis.

Figure 10:
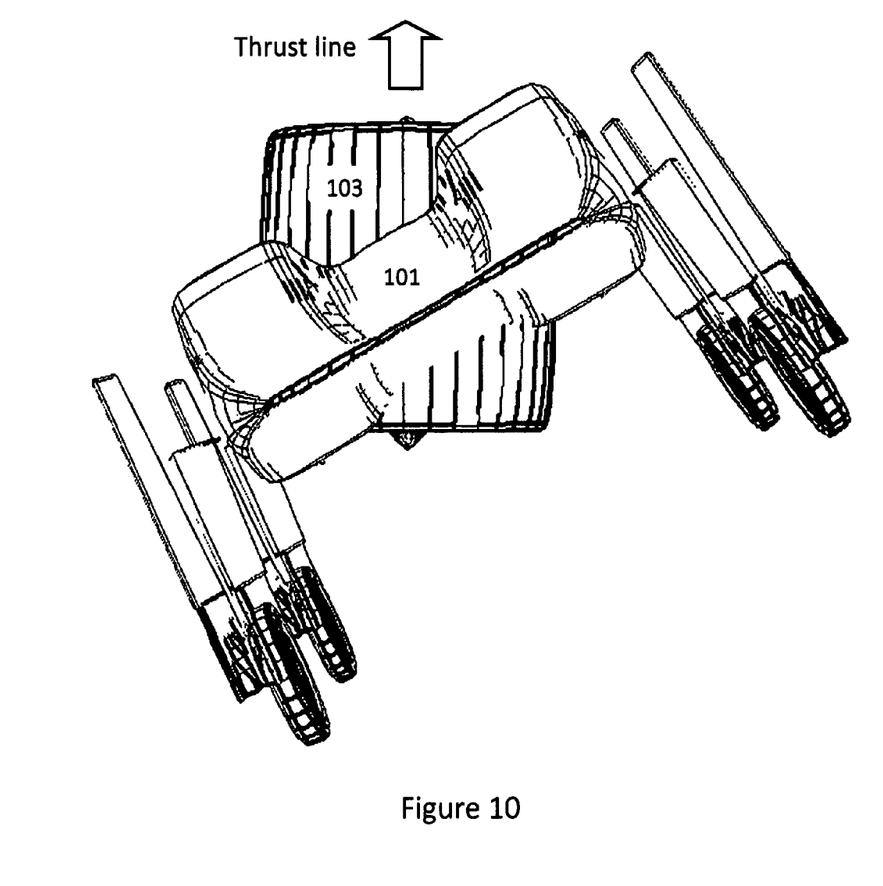
FIG. 10 shows how the same mechanism can be utilized in order to compensate for an off Center of Gravity condition in the lateral direction.

FIG. 10 shows how the same mechanism can be utilized in order to compensate for an off Center of Gravity condition in the lateral direction, by maintaining a vertical direction of the nacelle 103.

Figure 11:
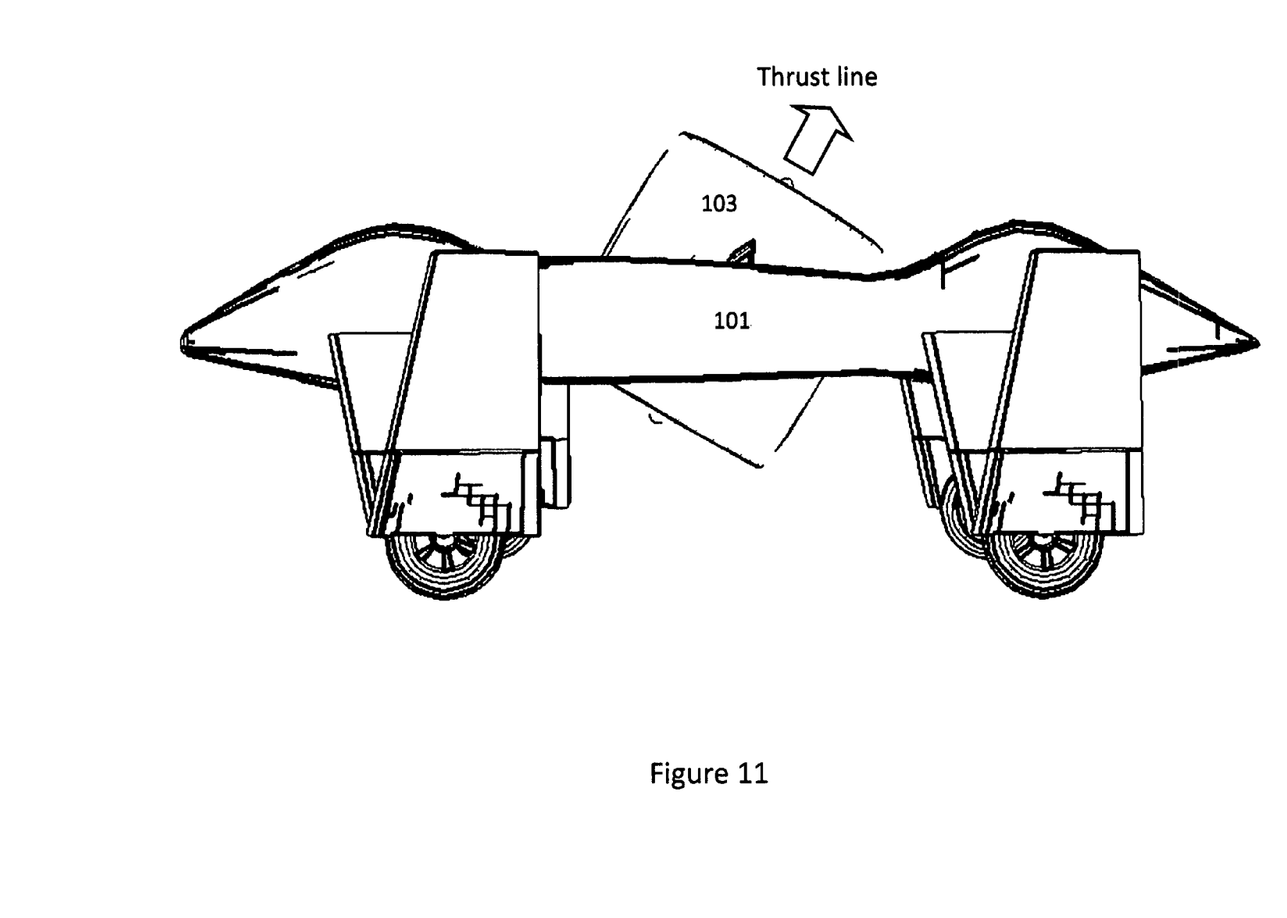
FIG. 11 illustrates how, in the hover mode, translation in the forward/aft direction is achieved, by tilting the engine nacelle around the lateral axis.

FIG. 11 illustrates how, in the hover mode, translation in the forward/aft direction is achieved, by tilting the engine nacelle 103 around the lateral axis.

Figure 12:
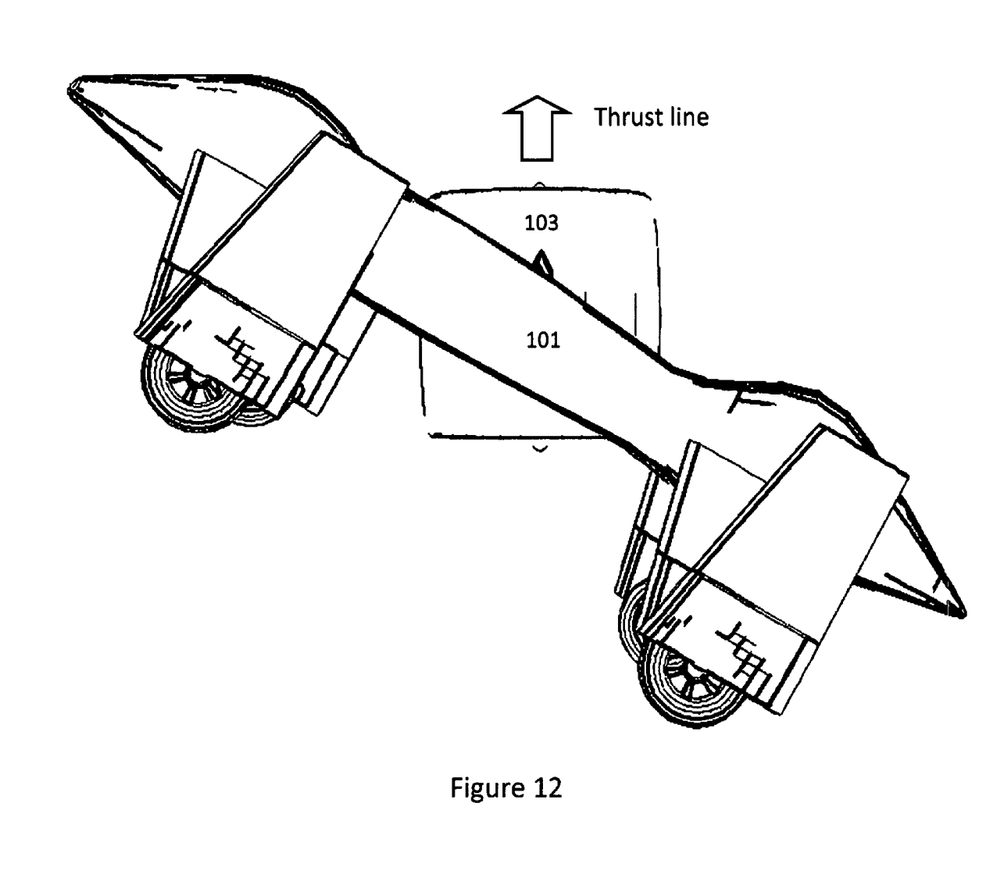
FIG. 12 shows how the same mechanism can be utilized in order to compensate for an off Center of Gravity condition in the forward/aft direction.

FIG. 12 shows how the same mechanism can be utilized in order to compensate for an off Center of Gravity condition in the forward/aft direction, by maintaining a vertical direction of the nacelle 103.

Figure 13:
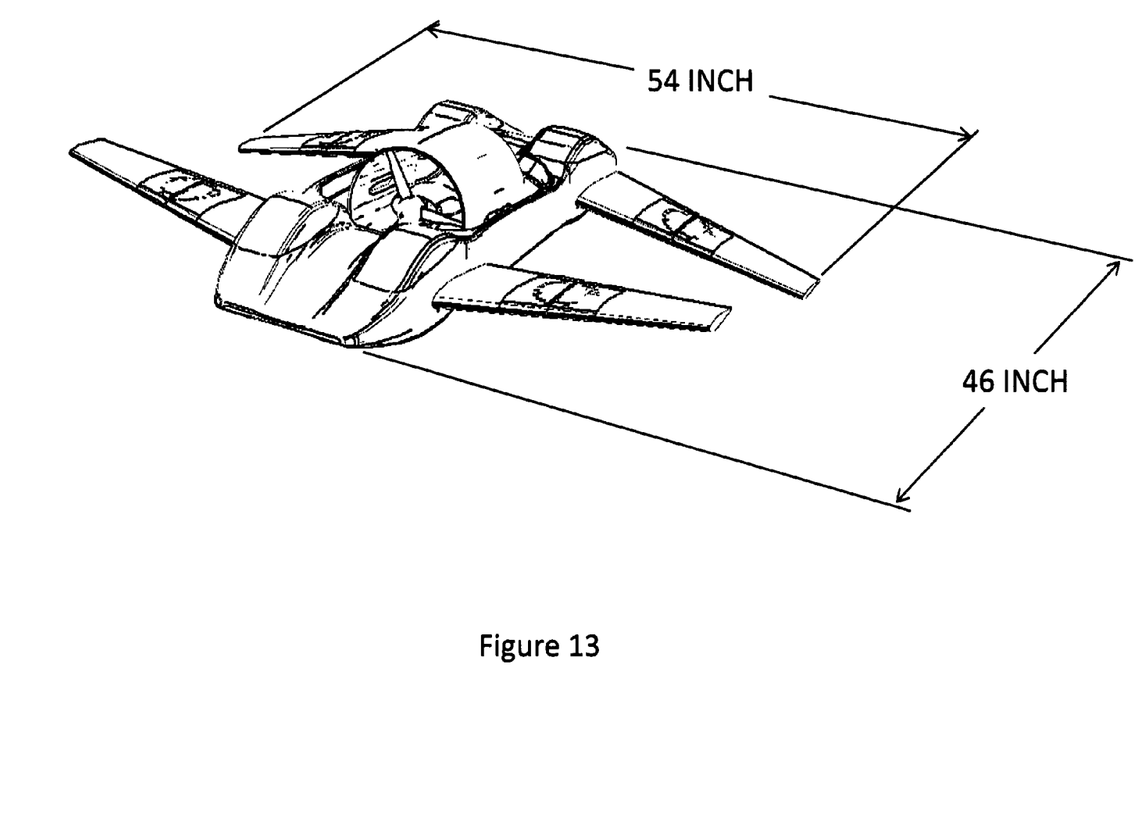
FIG. 13 displays a scale model of the invention.

FIG. 13 displays a scale model of the invention.

I claim:

1. A roadable vehicle capable of in-flight conversion between a vertical hover mode and a horizontal flight mode, as well as conversion to a roadable condition, comprising: a fuselage having a starboard side and a port side; two pairs of wing sections each extending from each of the port and starboard sides of the fuselage; a nacelle attached between the two sides of the fuselage and further affixed so as to be rotatable about a primarily lateral axis from a vertical position to a horizontal position during conversion between the vertical hover mode and the horizontal flight mode and from a horizontal position to a vertical position during reconversion between the horizontal flight mode and the vertical hover mode, the nacelle comprising: a pair of inline counter-rotating propellers, and a pair of inline counter rotating engines, each engine attached to one of the inline counter-rotating propellers; wherein the two pairs of wings are foldable such that the inner wing panels, comprising of one electric motor and automotive type of wheel and tire each, become the vehicle's landing gear during landing, and during road travel functions as the undercarriage.

2. The roadable vehicle of claim 1, wherein the nacelle is mounted so as to be rotatable about the longitudinal axis of the vertical roadable vehicle when the nacelle system is in the vertical position such that: rotation of the nacelle about the lateral axis provides a change in direction of the thrust to contain a longitudinal component, thereby permitting control of forward/aft location of the roadable vehicle, and; rotation of the nacelle about the longitudinal axis provides a change in direction of the thrust to contain a lateral component, thereby permitting control of roll of the roadable vehicle.

3. The roadable vehicle of claim 2, wherein the relative speed of the inline counter-rotating engines is controlled such that a difference in speed or torque between the engines creates an imbalance in the torque produced by each engine and propeller, the imbalance in the torque produced by each engine and propeller being operative to control yaw of the roadable vehicle.

4. The roadable vehicle of claim 1, wherein one of the inline counter-rotating engines is turned off in horizontal flight mode.

5. The roadable vehicle of claim 1, further comprising; flight controls for controlling the roadable vehicle pitch, roll and yaw, and; an automatic feedback control mechanism for stabilizing flight characteristics of the roadable vehicle when in vertical hover mode.

6. The roadable vehicle of claim 1, wherein the inline counter-rotating engines are internal combustion engines.

7. The roadable vehicle of claim 1, wherein the inline counter-rotating motors are electric motors.

8. The vertical roadable vehicle of claim 1, wherein the roadable vehicle further comprises a radio control receiver for receiving control signals from a remote control unit.

9. The roadable vehicle of claim 1, wherein the two engines can be tilted in opposite directions during hover, in order to accommodate small changes in the location of the center of gravity.

* * * * *